United States Patent Office 3,418,154
Patented Dec. 24, 1968

3,418,154
METHOD OF RENDERING GLASS SURFACES ABRASION-RESISTANT AND GLASS ARTICLES PRODUCED THEREBY
David P. Rawski, Toledo, Ohio, assignor to Owens-Illinois, Inc., a corporation of Ohio
No Drawing. Filed Dec. 31, 1964, Ser. No. 422,541
15 Claims. (Cl. 117—88)

ABSTRACT OF THE DISCLOSURE

Method of forming a thin, substantially colorless, transparent coating on glass surfaces, particularly glass containers, by applying a pyrolyzable titanium-containing compound to the glass surface and form a titanium oxide coating, cooling the glass surface and applying an emulsion of a fatty amide of the formula $RCONH_2$, wherein R is alkyl.

---

The present invention relates to the treatment of glass surfaces which are subjected to abrasive contact with each other in the course of handling, filling, and packaging operations and, more particularly, to a method of treating such glass surfaces to improve their resistance to abrasion. This invention further relates to improved abrasion-resistant glass articles produced by the aforesaid method.

Glass derives its strength from an unblemished surface, and any scratches or flaws which are present on its surface considerably decrease its strength, down to as little as one-fourth of its original value. While glass articles such as jars, bottles, tumblers, and the like, have their maximum strength as soon as they are formed, this strength rapidly diminishes as the articles come into contact with each other and with other surfaces, as occurs during the handling, packaging, and shipping of glassware. This problem is particularly acute in the food- and beverage-processing field wherein the glass containers are subjected to various processing cycles, whereby the bottles are successively filled, closed, and packaged for delivery. Many times the bottles are also subjected to washing, sterilizing, or vacuum treatments, depending upon the particular products with which they are filled.

During each of these operations, the bottles continuously come into contact with each other as they move from station to station and as they are handled by the various apparatus. Breakage of bottles during these operations, particularly after the bottles have been filled, presents additional problems to the processors and adds to the total cost of the operations. To minimize the resulting scratching and abrading of the glass surfaces during the aforesaid operations, numerous attempts have been made in the past to coat the exterior glass surfaces with the lubricant compositions. While coating compositions have been used commercially and impart good scratch-resistant properties to glass containers, the properties imparted by some of these compositions are considerably reduced, if not lost altogether, when the treated glass surface is wetted either by water or steam, during the processing cycle. Glass containers for beer, for example, are subjected to a caustic wash prior to being filled, and the glass surfaces, being constantly jostled together as they successively move along the conveyors to the filling, capping, and packaging stations, become scratched and weakened due to the loss of the scratch-resistant properties originally imparted by the coating. Since the product is packaged under pressure, as are carbonated beverages, for example, it is extremely desirable that the surfaces of the containers have as few scratches or abrasions as possible when they ultimately reach the consumer.

It will be appreciated that if the bottles are coated with a composition having good wet and dry scratch-resistant or abrasion-resistant properties, more bottles can be handled by the filling and packaging apparatus in the same amount of time merely by spacing the bottles closer together and increasing the speed of the conveyors. Even though the bottles will be subjected to more contacts with adjoining bottles, the coating will afford sufficient protection so as not to weaken the glass bottles.

Accordingly, it is an object of this invention to provide a method for forming an abrasion-resistant coating on glass surfaces while avoiding the shortcomings of the methods and compositions known and used in the past in attempting to form such abrasion-resistant coatings.

Another object of this invention is to provide a thin, substantially transparent coating on a glass surface, which coating is highly resistant to abrasion, while simultaneously substantially maintaining the strength characteristics of the glass.

Still another object of this invention is to provide a method for coating a glass surface, such as the exterior of a glass container, so as to impart thereto improved dry and wet scratch-resisting properties, thus permitting the container to undergo normal handling, processing, and shipping, with the consequent rubbing of the glass surface with other surfaces, without materially decreasing the strength of the container.

A further object of this invention is to provide an article of manufacture having a glass surface and, on said surface having a tightly adhering, thin, substantially colorless and transparent coating which coating imparts superior wet and dry scratch-resisting and abrasion-resisting properties to the glass surface.

Still another object of this invention is to provide glassware having a tightly adhering, thin, substantially colorless and transparent coating on its surface, which coating imparts increased strength and resistance to the ware, enabling it to withstand greater internal pressures without breaking.

A further object of this invention is to provide glassware having a thin, substantially colorless and transperent coating on its surface which coating is insoluble in water or caustic solutions, is free from taste and odor, and is nontixic, so as to permit the ware to be safely used for food and beverages.

In attaining the objects of this invention, one feature resides in treating a glass surface with a titanium-containing compound which is pyrolyzable, i.e., chemically decomposed by the action of heat, to form oxides of the metal on the glass surface while the surface is at a temperature above the pyrolyzing temperature of the compound, cooling the treated glass, such as in an annealing lehr, and applying to the cooled surface, while it is at a temperature within the range of about 150°–450° F., an emulsion of a fatty amide of the formula $RCONH_2$ which tenaciously bonds to the titanium oxide layer on the glass, and then driving the coated surface which now has the hard, thin, transparent coating formed thereon.

The above and other objects, features, and advantages of the present invention will become apparent to those skilled in the art upon a reading of the following description of the invention.

In carrying out the invention, the glass surface of an article of manufacture, such as a bottle, jar, tumbler, sheet glass, and the like, is first treated soon after the article leaves the glass-forming machine and as it is being conveyed to the annealing lehr. A solution of a titanium-containing compound is sprayed onto the exterior of the glass surface while the glass surface is at a temperature above the pyrolyzing temperature of the compound. The temperature of the shaped ware, as it leaves the glass-forming machine, is such that it is above the pyrolyzing temperature of the compounds. The range of temperatures necessary to pyrolyze the titanium-containing compounds is between about 700° and 1300° F., depending upon the particular compound used, with the preferred range being from about 900° to 1200° F.

The titanium-containing compound which is employed for the purpose of this invention is one which upon contact with the heated glass surface will react to form a substantially colorless, transparent layer or coating of titanium oxide, primarily $TiO_2$, which layer or coating tightly adheres to the surface of the glass and can have an average thickness of up to about 1 micron, but is preferably less than 1 micron.

Among the titanium-containing compounds suitable for purposes of this invention are volatile metallo-organic compounds such as the alkyl titanates, preferably where the alkyl group has from 1–8 carbon atoms, and including tetrabutyl titanate, tetraisopropyl titanate, tetra-ethylhexyl titanate, and the like. Also included among the suitable titanium-containing compounds are the titanium tetrahalides and particularly titanium tetrachloride, titanium tetrabromide, and titanium tetraiodide. Ammonium salts of titanium lactate are also suitable.

As the glass articles, now coated with the thin, transparent titanium oxide layer, enter the annealing lehr and are progressively cooled over a period of time to about 400° F. and lower, they are sprayed with an organic coating composition consisting of an emulsion of a fatty amide of the formula $RCONH_2$. When the second coating has dried, the resultant coated article has a scratch-resistance value which is unexpectedly and vastly superior to that of a glass surface having either coating alone.

The fatty acid amides of the formula $RCONH_2$ useful for the purpose of this invention are those wherein R is an alkyl, and particularly an alkyl having from 11 to 17 carbon atoms. Stearylamide, palmitylamide, oleylamide and linoleylamide are representative of such fatty acid amides.

Emulsions suitable for the purpose of the invention are prepared by mixing the fatty acid amide with suitable dispersing agents and emulsifying agents, and heating the mixture until the components melt. Water, previously heated to 160° F. is slowly added with agitation of the mixture and the agitation is continued until the temperature of the emulsion drops to 100–110° F.

The following emulsions were prepared by the foregoing procedure, parts being indicated by weight percentage.

EMULSION A

| | |
|---|---|
| Oleylamide | 10 |
| Emulsifying agent (Ethamid 0/15) | 2 |
| Dispersing agent (Ethofat 142/20) | 1 |
| Water | 87 |

EMULSION B

| | |
|---|---|
| Oleylamide | 10 |
| Emulsifying agent (Ethomid 0/15) | 1 |
| Dispersing agent: | |
|    Ethofat 142/20 | 1 |
|    Ethomeen 18/60 | 1 |
| Water | 87 |

The aforementioned emulsifying and dispersing agents are the products of Armour Industrial Chemical Company. Ethomid 0/15 is a nonionic ethylene oxide condensate of oleic acid amides having 5 moles of oxide added per mole of acid. Ethofat 142/20 is a nonionic polyoxyethylene glycol ester of rosin and fatty acids having 10 moles of ethylene oxide adder per mole of acid. Ethomeen 18/60 is a cationic ethylene oxide condensation product of stearic acid amines having 50 moles of oxide per mole of acid.

Prior to spraying onto the titanium oxide-coated glass surface, the emulsion is diluted to 0.5% by weight oleylamide with water.

The following examples are merely illustrative of the present invention and should not be considered limiting its scope in any way.

Example 1

A tetrabutyl titanate solution consisting of one part by volume of titanate and two parts by volume of anhydrous n-butanol was prepared by dissolving the titanate ester at room temperature in the solvent. The solution thus obtained was sprayed by a DeVilbiss Multimister, using compressed dry air, onto the exterior surface of glass bottles at the rate of 0.5 g.p.h. as they were continuously being conveyed from the bottle-forming machine to the annealing lehr. The temperature of the surface was about 1100° F. and the titanate was pyrolyzed almost immediately. A clear, transparent coating formed upon the surface of the bottles which was hard, but the bottles could, nevertheless, be scratched by firmly rubbing them against each other.

Example 2

A number of bottles were first treated by the process as defined in Example 1, and the coated bottles were then further treated by spraying thereon, as their surfaces cooled to about 200° to 300° F., with the aforesaid aqueous Emulsion A, wherein the oleylamide was present in an amount of 0.5% by weight of the emulsion. The spraying was at the rate of ½ g.p.h., and a DeVilbiss AGA transverse spray gun was used. The combined thickness of the coatings was less than 1 micron. When two of the bottles were rubbed hard against each other, no scratches developed on either bottle.

Example 3

A number of bottles were treated by the process as defined in Example 2, except that the aforesaid Emulsion B was used in place of Emulsion A.

Bottles treated in accordance with the foregoing examples were tested with a scratch test machine to evaluate the effectiveness of the respective coatings. The machine is designed to abrade the surface of one glass bottle against the surface of a similar bottle, and is described and illustrated in pending application Ser. No. 355,252, filed Mar. 27, 1964 and assigned to the same assignee. Thus, a bottle is fastened securely in a stationary low set of chucks, while a second bottle is fastened in a set of upper chucks, which are positioned so that the axes of the bottles are at 90° relative to each other. A test load is applied to the upper bottle while it is being driven at a constant speed of 2.8 inches per minute in a direction 45° to the axis of each bottle. The actual rate of scratch propagation on the bottles is then 2 inches per minute.

Using the aforesaid test apparatus, a fresh surface of one bottle is always contacted with a fresh surface of the other bottle. Since the base of each bottle extends in the direction of motion, the scratch is propagated from the shoulder portion toward the base. This permits the detection of poor scratch protection in a particular section of the ware, since identical sections of each bottle are contacted.

The force exerted by the second bottle is a known, measured force and, after each pass, the bottles are examined for scratches. The force, or load, in pounds was measured with respect to the scratch resistance of the dry bottles; of bottles which were wetted with water, i.e., measured while the contacting surfaces in the above test machine were submerged in water; and bottles which had been first subjected to a caustic wash comprising a 5% NaOH aqueous solution at a temperature of 150° F. for a period of one-half hour. The results are set forth below and are compared with an uncoated bottle.

TABLE I

| Example | Number of pounds to produce scratch | | | |
|---|---|---|---|---|
| | Dry | Wet | After caustic wash Dry | Wet |
| Uncoated Bottle | 2 | 3 | 2 | 5 |
| 1 | 2 | 2 | 7 | 4 |
| 2 (Emulsion A) | 105 | 95 | 50 | 85 |
| 3 (Emulsion B) | 105 | 105 | 85 | 95 |

From the above table, the unexpected and synergistic results obtained by the process of the present invention over the coating of Example 1 are readily demonstrated, particularly with respect to the improved dry and wet properties and the improved wet properties of the bottles after the caustic wash. Since almost all food containers are subjected to a plurality of operations including washing, pasteurizing, sterilization, caustic baths, and the like, the risk of scratching or abrading the bottles is particularly acute at such times, and it is precisely at such times that the coating of the present invention affords the most protection to the glass surfaces.

Statistically, the same results are obtained when the oleylamide is substituted by the stearylamide, palmitylamide and linoleylamide.

For purposes of this invention, it has been found that excellent results are obtained when the amount of titanium ester, such as tetrabutyl titanate, in the solvent, n-butanol, is about 1 part ester per two parts solvent, although up to 6 parts of solvent may be used per each part of ester. However, the scratch-resistance properties imparted to the glass are reduced when the ratio of titanate to solvent exceeds 1:3. When tetraisopropyl titanate is used for the hot-end coating, best results are obtained when the ratio of titanate to solvent is up to 1:2.5 parts isopropyl alcohol. When the alcohol solvent is present in larger amounts, the scratch-resistance properties imparted to the glass surface are reduced. While the titanates can be applied in 100% concentrations and good results are obtained, it is preferred to dissolve the titanate in a suitable solvent so as to facilitate the spraying thereof. One skilled in the art would merely have to make the necessary adjustments in the spraying apparatus to insure that a sufficient amount of ester was pyrolyzed to form the tightly adhering, substantially colorless and transparent titanium oxide coating on the glass surface.

Bottles coated in accordance with the invention also have excellent slip lubricity properties as compared to uncoated or titanium oxide-coated bottles.

Having fully described the invention, what is claimed is:

1. A method for increasing the abrasion-resistance of a glass surface comprising applying to said surface a titanium-containing compound which is pyrolyzable to form oxides of titanium on said glass surface while said surface is at a temperature at least as high as the pyrolyzing temperature of said compound, cooling said treated surface to a temperature below 450° F. and applying onto said still heated glass surface a fatty acid amide of the formula $RCONH_2$, wherein R is an alkyl, in an amount sufficient to form a thin, tightly adhering, transparent coating on said surface.

2. The method as defined in claim 1 wherein said titanium-containing compound is selected from the group consisting of alkyl titanates, titanium tetrahalides and the ammonium salt of titanium lactate.

3. The method as defined in claim 2 wherein said alkyl titanates have from 1 to 8 carbon atoms.

4. The method as defined in claim 3 wherein said alkyl titanate is tetrabutyl titanate.

5. The method as defined in claim 3 wherein said alkyl titanate is tetraisopropyl titanate.

6. The method as defined in claim 2 wherein said titanium-containing compound is titanium tetrachloride.

7. The method as defined in claim 1 wherein said fatty acid amide is a member selected from the group consisting of stearylamide, oleylamide, palmitylamide and linoleylamide.

8. The method as defined in claim 1 wherein said fatty acid amide is oleylamide.

9. A method for increasing the abrasion-resistance of a glass surface comprising spraying onto said surface a titanium-containing compound which is pyrolyzable to form an invisible coating of oxides of titanium on said glass surface while said surface is at a temperature at least as high as the pyrolyzing temperature of said compound, cooling said treated surface to a temperature below 450° F. and spraying onto said still heated, coated, glass surface an emulsion of a fatty acid amide of the formula $RCONH_2$ wherein R is an alkyl, in an amount sufficient to form a thin, tightly adhering, transparent coating on said surface.

10. The method as defined in claim 9 wherein said titanium-containing compound is selected from the group consisting of alkyl titanate, titanium tetrahalide and the ammonium salt of titanium lactate.

11. The method as defined in claim 9 wherein R is an alkyl having from 11 to 17 carbon atoms.

12. The method as defined in claim 9 wherein said fatty acid amide is a member selected from the group consisting of stearylamide, oleylamide, palmitylamide and linoleylamide.

13. The method as defined in claim 12 wherein said fatty acid amide is oleylamide.

14. The method as defined in claim 9 wherein said emulsion is an aqueous emulsion and said fatty acid amide is present therein in an amount of about 0.2 to 1.0 percent by weight.

15. An article of manufacture having a glass surface which has been made abrasion-resistant by having a thin, tightly adhering, transparent coating formed thereon by the method defined in claim 1.

References Cited

UNITED STATES PATENTS 3,323,889   6/1967   Carl et al. _____ 65—60 XR

ALFRED L. LEAVITT, Primary Examiner.

W. F. CYRON, Assistant Examiner.

U.S. Cl. X.R.

117—69, 124, 167